United States Patent [19]

Huang

[11] Patent Number: 5,778,496

[45] Date of Patent: Jul. 14, 1998

[54] STRAPPING DEVICE

[76] Inventor: Han-Ching Huang. No. 12. Alley 111. Lane 437. Chen Hsing Road. Taichung, Taiwan

[21] Appl. No.: 931,311

[22] Filed: Sep. 16, 1997

[51] Int. Cl.⁶ .......................... A44B 21/00; B25B 25/00
[52] U.S. Cl. .................. 24/68 CD; 24/68 R; 24/68 B
[58] Field of Search .................. 24/68 CD, 68 R, 24/68 SB, 68 BT, 68 SK, 68 B, 68 D, 19; 254/218

[56] References Cited

U.S. PATENT DOCUMENTS

| | | | |
|---|---|---|---|
| 3,175,806 | 3/1965 | Prete, Jr. | 24/68 CD |
| 4,199,182 | 4/1980 | Sunesson | 24/68 CD |
| 4,570,305 | 2/1986 | Smetz et al. | 24/68 R |
| 5,369,848 | 12/1994 | Huang | 24/68 B |
| 5,560,086 | 10/1996 | Huang | 24/68 CD |

*Primary Examiner*—Victor N. Sakran
*Attorney, Agent, or Firm*—Charles E. Baxley, Esquire

[57] ABSTRACT

A strapping device includes two plates pivotally connected a U-shaped handle by a shaft to which two ratchets are disposed, each one of two distal ends of the handle has a cam means formed thereto, a control member and a pawl member respectively and movably disposed to the handle and between the two plates, both of the control and the pawl member engaged with the ratchets, a first board and a second board respectively and pivotally disposed between the two plates wherein a front end of the first board is located beneath a rear end of the second board, a first pin movably connected between the two plates and located beneath a rear end of the first board, two sliding plates slidably mounted to outside of the two plates with a first rod extending through third slots in the plates and the fourth slots in the sliding plates, the first rod received in a groove in a front end of the second board, a second rod extending through the fourth slots and first holes in the plates and a third rod connected between the two sliding plates. The first pin is lifted by a rotation of the cam means of the handle to actuate the first and the second board pivoted to let the sliding plates be pulled by a strap having one end thereof connected to the third rod and stopped within the third slots of the plates.

3 Claims, 8 Drawing Sheets

STRAPPING DEVICE

BACKGROUND OF THE INVENTION

1. Field of the Invention

The present invention relates to a strapping device and, more particularly, to an improved strapping device which allows a tensioned strap to run a short distance before it is completely loosened so that a user can check the strapped piles of goods are piled stably or not.

2. Brief Description of the Prior Art conventionally, goods is received in boxes or the like which are piled up on a truck for transportation. In order to keep the piles of boxes in a stable status, straps are used to strap the boxes tightly by operating a strapping device which is disclosed in U.S. Pat. No. 5,560,086 to Han-ching HUANG, issued on Oct. 1, 1996. The straps are so stretched to hold the piles of boxes to be a whole block so that the boxes will not drop even if vibration is transmitted thereto during transportation. When the boxes are to be removed from the truck, a user has to loosen the straps by reversely operating the strapping device. If the piles of the boxes are not stable because vibration during transportation, for example, then when the straps are suddenly loosened, the boxes could drop and injure the operator and/or other workers. It is extremely dangerous if no checking processes are executed.

The present invention intends to provide an improved strapping device to mitigate and/or obviate the above-mentioned problem.

SUMMARY OF THE INVENTION

In accordance with one aspect of the present invention, there is provided a strapping device comprising a pair of plates each having a first end and a second end and a connecting plate connected between the two plates wherein the connecting plate has a stud extending upwardly therefrom. A first slot and a second slot are respectively defined in each of the plates near the first end thereof, wherein a periphery defining each of the second slots has a downward slope for a first pin received therein. Each of the plates has a third slot and a first hole respectively defined therein and located near the second end thereof. A concavity is defined in a periphery defining each of the third slots and located opposite to the first hole. At least one of the plates has a stop extending from the first end thereof which has a recess defined therein. Each of the two plates has a first aperture and a second aperture defined therethrough.

A U-shaped handle has two arms respectively and pivotally connected to the first ends of the two plates by a shaft extending the respective distal ends of the two arms and the respective first ends of the two plates. Two ratchets are respectively and securely mounted to the shaft and located between each pair of the plate and the arm. Each one of the two arms has a cam means formed to a distal end thereof.

A control member is slidably and biasedly disposed between the two arms and has two protrusions extending from a lower portion thereof so as to be respectively engaged with the ratchets. A pawl member is biasedly and slidably received in the first slots with two ends thereof respectively engaged with the two ratchets. A spring is connected between the pawl member and the stud.

A first board has an opening defined therethrough so as to receive the stud therein and two first side plats so that the first board is movably disposed between the two plates by extending a second pin through the two second apertures and the two first side plates. The first pin is located beneath a rear end of the first board. A first torsion member is mounted to the second pin and presses the rear end of the first board downwardly.

A second board has two second side plats and is movably disposed between the two plates by extending a third pin through the two first apertures and the two second side plates wherein a rear end of the second board is located beneath a front end of the first board. A front end of the second board has a groove defined transversely therein and a second torsion member is mounted to the third pin to press the front end of the second board downwardly.

Two sliding plates are respectively disposed to outside of the two plates and each of which has a fourth slot and a second hole defined therethrough. A first rod extends through the fourth slots of the two sliding plates and the cavities and is received in the groove of the second board. A second rod extends through the fourth slots of the two sliding plates and the first holes of the two plates. A third torsion member is mounted to the second rod and presses the first rod downwardly. A third rod is fixedly connected between the two sliding plates and extends through the two second holes.

It is an object of the present invention to provide a strapping device having a safety feature so allow a user to check the strapped piled goods before the strap is completely loosened.

It is another object of the present invention to provide a strapping device having two sliding plates which slide a distance before the strap is completely loosened.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
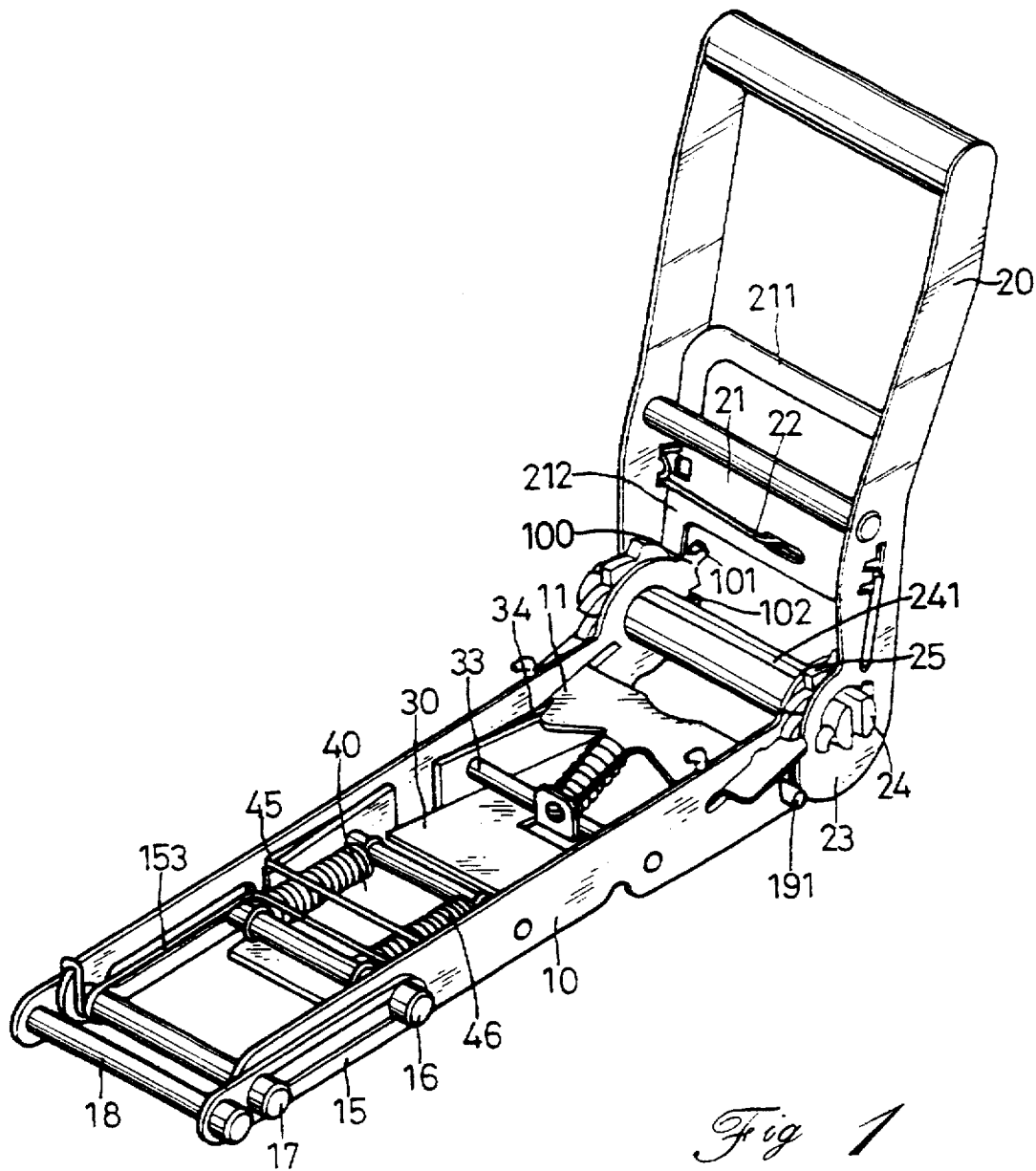
FIG. 1 is a perspective view of a strapping device in accordance with the present invention.
Figure 2:
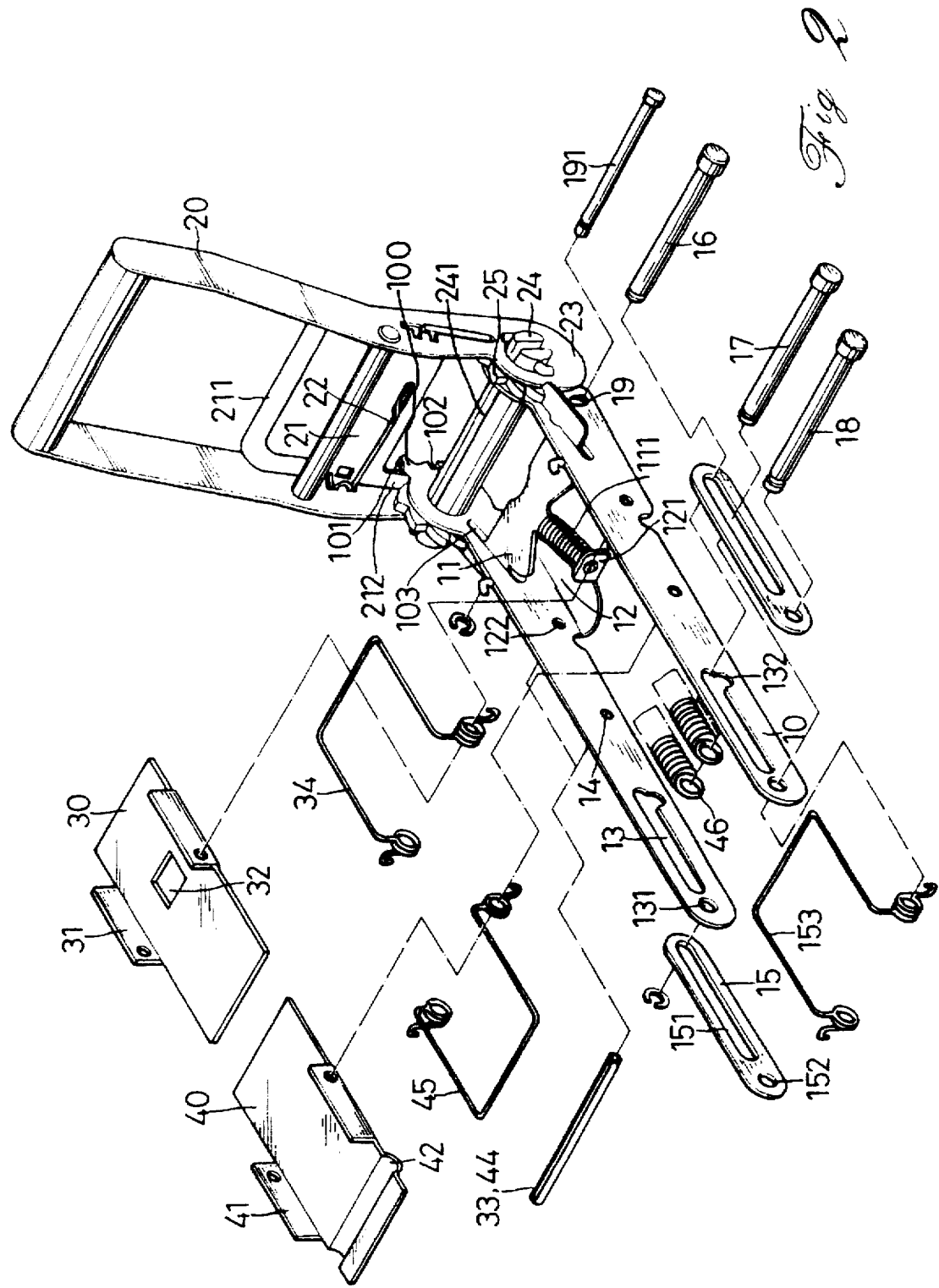
FIG. 2 is an exploded view of a strapping device in accordance with the present invention.
Figure 3:
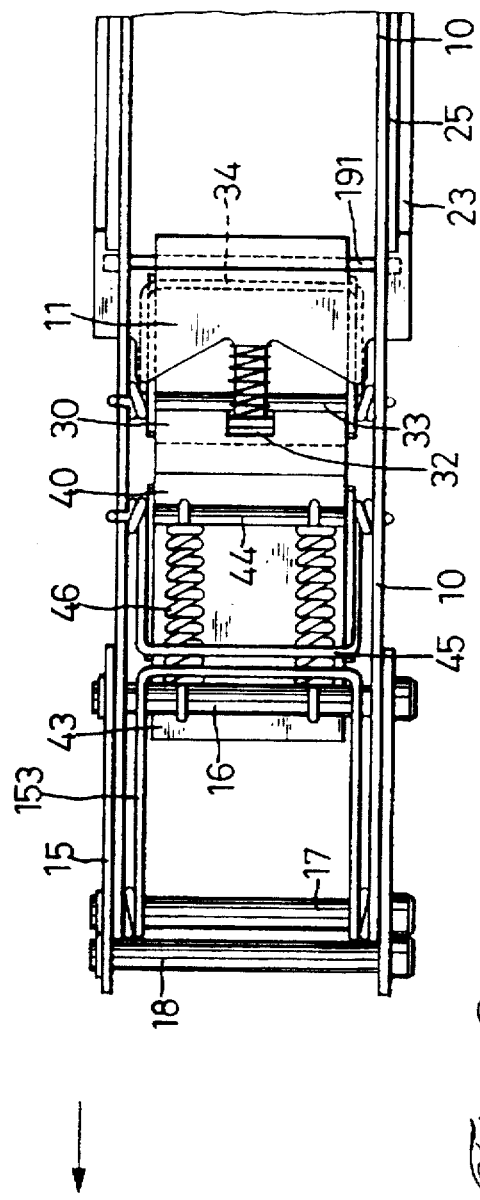
FIG. 3 is a top plan view of the strapping device in accordance with the present invention.

Referring to the drawings and initially to FIGS. 1 through 3, a strapping device in accordance with the present invention generally includes a pair of plates 10 each having a first end and a second end and a connecting plate 12 connected between the two plates 10 wherein the connecting plate has a stud 121 extending upwardly therefrom. A first slot 103 and a second slot 19 are respectively defined in each of the plates 10 near the first end thereof wherein a periphery defining each of the second slots 19 has a downward slope for a first pin 191 received between the two second slots 19. Each of the plates 10 has a third slot 13 and a first hole 131 respectively defined therein and located near the second end thereof. A periphery defining each of the third slots 13 has a concavity 132 defined therein which is located opposite to the first hole 131. Each one of the plates 10 has a stop 100 extending from the first end thereof which has a recess 101 defined therein a notch 102 is defined in each the first end of each of the two plates 10. Each of the two plates 10 has a first aperture 111 and a second aperture 122 defined therethrough.

Figure 4:
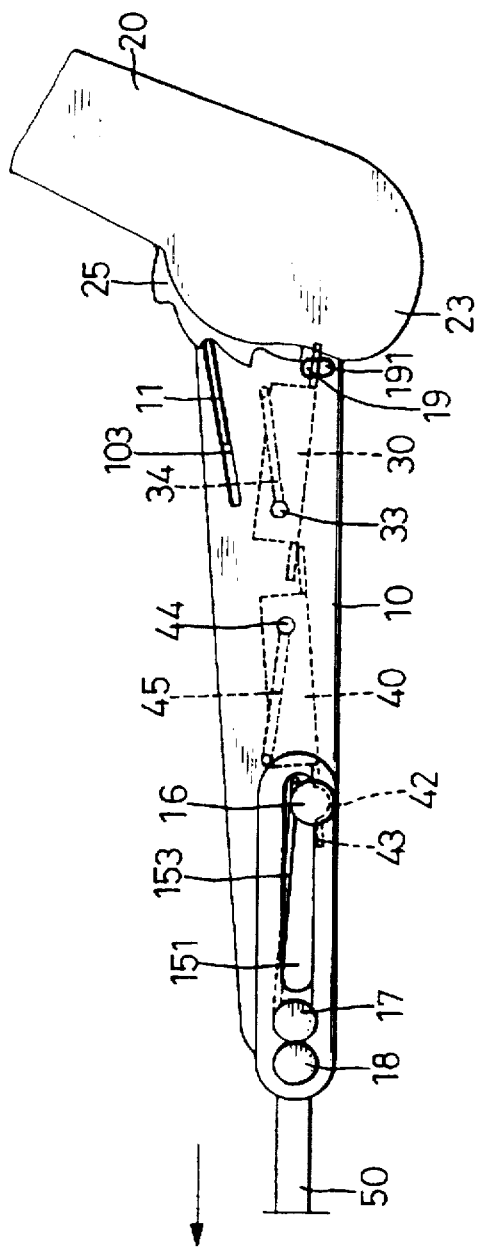
FIG. 4 is a side elevational view, partly in section, of the strapping device of the invention.

A U-shaped handle has two arms 20 which are respectively and pivotally connected to the first ends of the two plates 10 by a shaft 24 extending through the respective distal ends of the two arms 20 and the respective first ends of the two plates 10. The shaft 24 has a slit 241 defined longitudinally therethrough so as to securely receive one of two ends of a strap 50 (FIGS. 1–3 not shown, the other end of the strap is shown in FIG. 4) Two ratchets 25 are respectively and securely mounted to the shaft 24 and located between each pair of the plate 10 and the arm 20. A cam means 23, a protruding portion in this embodiment, is formed to a distal end of each one of the two arms 20. A control member 21 having a pulling handle 211 is slidably and biasedly disposed between the two arms 20 by a torsion member 22 and has two protrusions 212 extending from a lower portion thereof so as to be respectively engaged with the ratchets 25.

A pawl member 11 is biasedly and slidably received in the first slots 103 with two ends thereof extending through the two first slots 103 and respectively engaged with the two ratchets 25. A spring 111 is connected between the pawl member 11 and the stud 121 so as to normally urge the pawl member 11 to engage with the ratchets 25.

A first board 30 is has an opening 32 defined therethrough so as to receive the stud 121 therein, and two first side plats 31 extending upwardly from two opposite sides thereof. The first board 30 is movably disposed between the two plates 10 by extending a second pin 33 through the two second apertures 122 and the two first side plates 31 such that the first pin 191 is located beneath a rear end of the first board 30. A first torsion member 34 is mounted to the second pin 33 and presses the rear end of the first board 30 downwardly.

A second board 40 has two second side plats 41 extending upwardly from two opposite sides thereof and is movably disposed between the two plates 10 by extending a third pin 44 through the two first apertures 111 and the two second side plates 41. The second board 40 is positioned so that a rear end of the second board 40 is located beneath a front end of the first board 30. A front end of the second board 40 has a groove 42 defined transversely therein. A second torsion member 45 is mounted to the third pin 44 and presses the front end of the second board 40 downwardly.

Two sliding plates 15 are respectively disposed to outside of the two plates 10 and each of the sliding plates 15 has a fourth slot 151 and a second hole 152 defined therethrough.

A first rod 16 extends through the fourth slots 151 of the two sliding plates 15 and the cavities 132 and is received in the groove 42 of the second board 40. A second rod 17 extends through the fourth slots 151 of the two sliding plates 15 and the first holes 131 of the two plates 10. A third torsion member 153 is mounted to the second rod 17 and presses the first rod 16 downwardly. Two second springs 46 are connected between the first rod 16 and the third pin 44. A third rod 18 is fixedly connected between the two sliding plates 15 and extends through the two second holes 152. The other end of the strap 50 is fixedly connected to the third rod 18.

Figure 5:
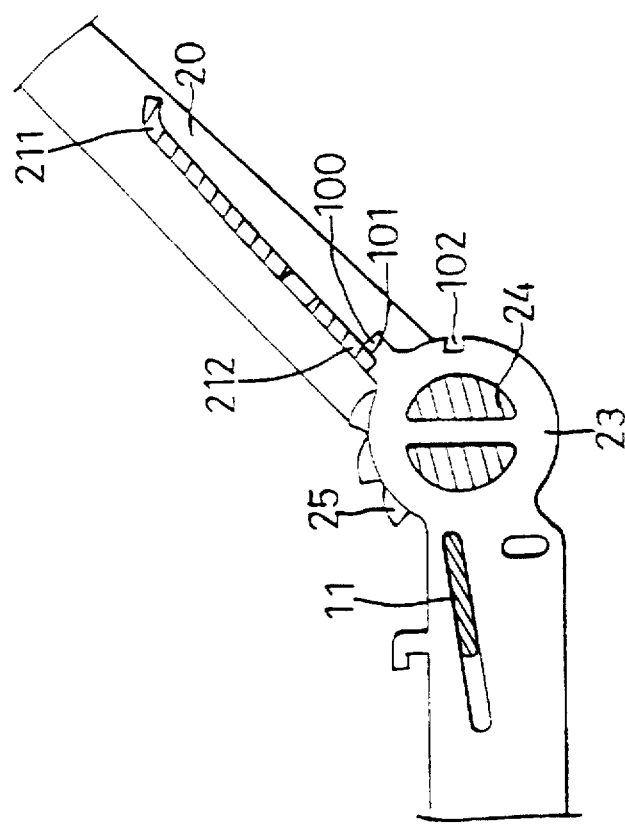
FIG. 5 is a side elevational view, partly in section, of the strapping device wherein the handle is pivoted to let the protrusions be disengaged from the ratchets and rested in the recesses of the stops of the plates.
Figure 6:
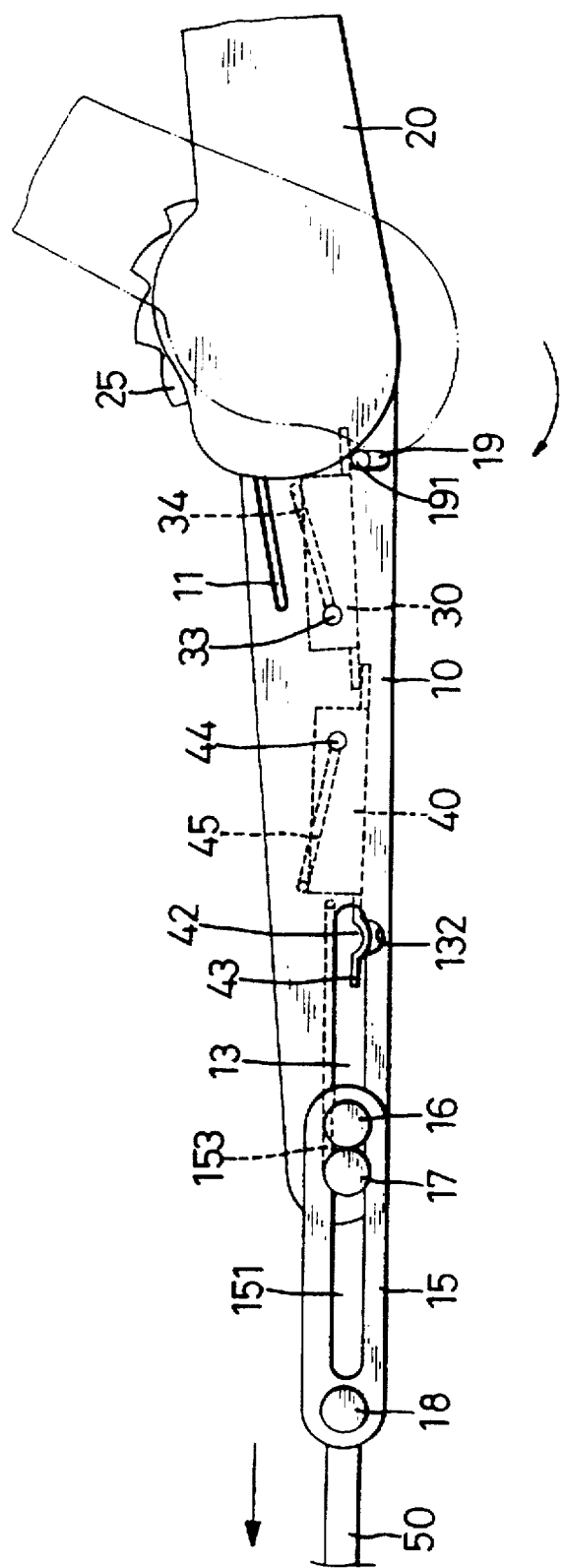
FIG. 6 is a side elevational view, partly in section, of the strapping device as shown in FIG. 5, wherein the first pin is lifted and the two sliding plates slide a distance.
Figure 7:
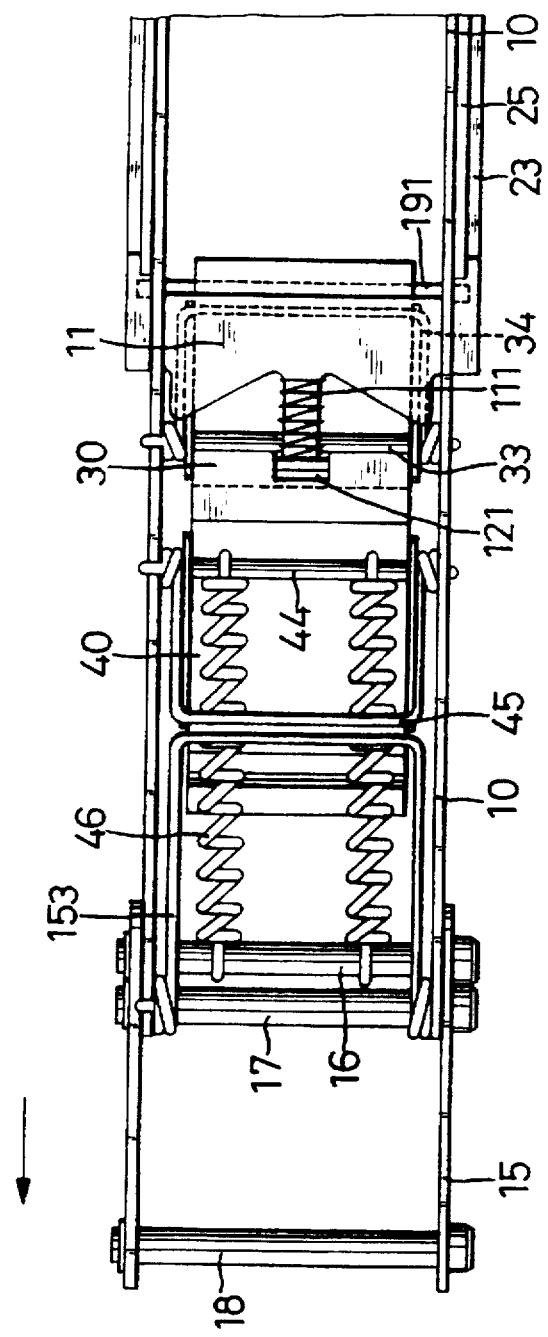
FIG. 7 is a top plan view of the strapping device as shown in FIG. 6.

Referring to FIGS. 4 and 5, when checking strapped piles of goods strapped by the strap 50, the pulling handle 211 of the control member 21 is pulled upwardly and the handle is pivoted clock-wise to rest the two protrusions 212 in the recesses 101. During the rotation of the handle, the first pin 191 is lifted by the cam means 23 and which raises the rear end of the first board 30, the front end of the first board 30 then pushes the rear end of the second board 40 downwardly, and the front end of the second board 40 is lifted accordingly to raise the first rod 16 from the groove 42. Because the strap 50 is stretched by a large tension force, once the first rod 16 is not received in the groove 42, the tension force of the strap 50 pulls the two sliding plates 15 a distance the same as a length of the third slot 13 and the sliding plates 15 are stopped when the first rod 16 contacts an end of the periphery defining the third slot 13 as shown in FIGS. 6 and 7.

Figure 8:
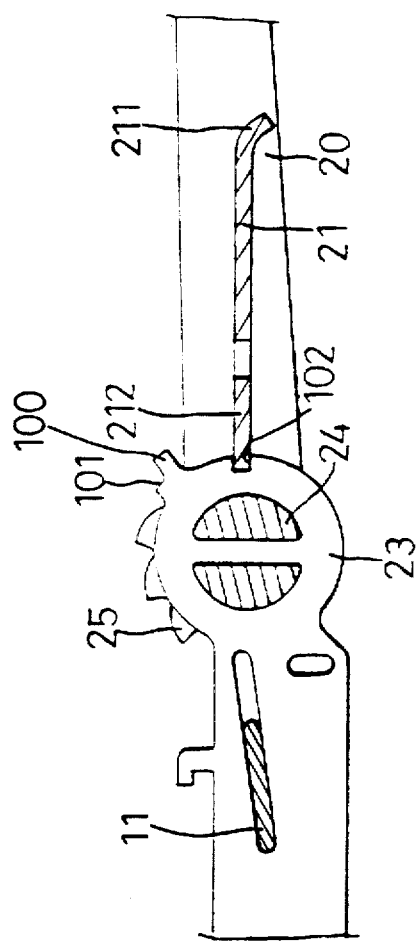
FIG. 8 is a side elevational view, partly in section, of the strapping device wherein the protrusions are received in the notches of the plates.
Figure 9:
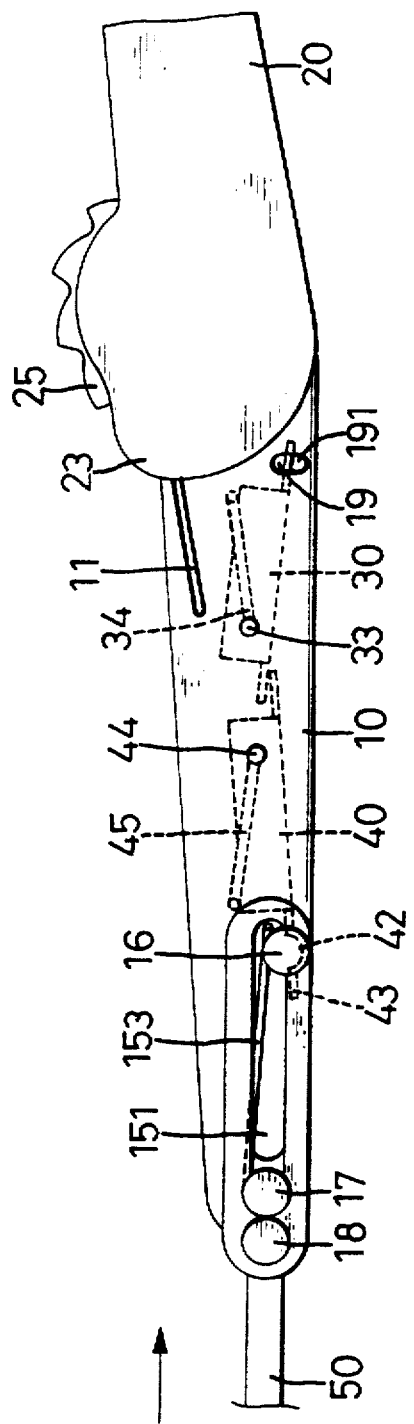
FIG. 9 is a side elevational view, partly in section, of the strapping device as shown in FIG. 8 wherein the handle is pivoted to push the pawl member to be disengaged from the ratchets.

Please refer to FIGS. 8 and 9, if the strap 50 is going to be loosened completely, the handle together with the grasped pulling handle 211 are further pivoted to move the protrusions 212 across the stops 100 and received in the notches 102 to securely position the handle. The pawl member 11 is pushed by the cam means 23 when the handle is further pivoted to disengage from the ratchets 25 such that the ratchets 25 and the strap 50 are rotated by the tension force. Once the tension force is disappeared because of the free rotation of the shaft 24, the two sliding plates 15 are biasedly returned to their original position by the two second springs 46.

Although the invention has been explained in relation to its preferred embodiment, it is to be understood that many other possible modifications and variations can be made without departing from the spirit and scope of the invention as hereinafter claimed.

What is claimed is:

1. A strapping device comprising:

a pair of plates each having a first end and a second end and a connecting plate connected between said two plates wherein said connecting plate has a stud extending upwardly therefrom, a first slot and a second slot respectively defined in each of said plates near said first end thereof, a periphery defining each of said second slots having a downward slope and a first pin received between said two second slots, each of said plates having a third slot and a first hole respectively defined therein and located near said second end of said corresponding plate, a concavity defined in a periphery defining each of said third slots and located opposite to said first hole, at least one of said plates having a stop extending from said first end thereof which has a recess defined therein, each of said two plates having a first aperture and a second aperture defined therethrough;

a U-shaped handle having two arms respectively and pivotally connected to said first ends of said two plates by a shaft extending through said respective distal ends of said two arms and said respective first ends of said two plates, two ratchets respectively and securely mounted to said shaft and located between each pair of said plate and said arm, a cam means formed to a distal end of each one of said two arms;

a control member slidably and biasedly disposed between said two arms and having two protrusions extending from a lower portion thereof so as to be respectively engaged with said ratchets;

a pawl member biasedly and slidably received in said first slots with two ends thereof extending through said two first slots and respectively engaged with said two ratchets, a spring connected between said pawl member and said stud;

a first board having an opening defined therethrough so as to receive said stud therein, and two first side plates so that said first board is movably disposed between said two plates by extending a second pin through said two second apertures and said two first side plates such that said first pin is located beneath a rear end of said first board, a first torsion member mounted to said second pin and pressing said rear end of said first board downwardly;

a second board having two second side plats and movably disposed between said two plates by extending a third pin through said two first apertures and said two second side plates wherein a rear end of said second board is located beneath a front end of said first board, a front end of said second board having a groove defined transversely therein, a second torsion member mounted to said third pin and pressing said front end of said second board downwardly;

two sliding plates respectively disposed to outside of said two plates and each of said sliding plates having a fourth slot and a second hole defined therethrough;

a first rod extending through said fourth slots of said two sliding plates and said cavities and received in said groove of said second board;

a second rod extending through said fourth slots of said two sliding plates and said first holes of said two plates, a third torsion member mounted to said second rod and pressing said first rod downwardly;

a third rod fixedly connected between said two sliding plates and extending through said two second holes.

2. The strapping device as claimed in claim 1 wherein said first end of each of said two plates has a notch defined therein so as to receive said protrusions therein.

3. The strapping device as claimed in claim 1 wherein at least one second spring is connected between said first rod and said third pin.

* * * * *